United States Patent [19]

Brown et al.

[11] 4,161,395

[45] Jul. 17, 1979

[54] FOAM AND LIQUOR SEPARATOR

[75] Inventors: Norris K. Brown; James W. Foust, both of Salt Lake City, Utah

[73] Assignee: Envirotech Corporation, Menlo Park, Calif.

[21] Appl. No.: 890,644

[22] Filed: Mar. 20, 1978

[51] Int. Cl.² .......................................... B01D 19/02
[52] U.S. Cl. .................................. 55/178; 55/191; 55/192; 55/204; 210/406
[58] Field of Search .................... 55/87, 52, 55, 178, 55/190–193, 204, 205; 210/406; 162/380

[56] References Cited

U.S. PATENT DOCUMENTS

| 2,849,930 | 9/1958 | Freeman et al. | 55/191 |
| 3,007,542 | 11/1961 | Giampapa et al. | 55/191 X |
| 3,396,513 | 8/1968 | Humphreys | 55/191 X |

Primary Examiner—Charles N. Hart
Assistant Examiner—Richard W. Burks
Attorney, Agent, or Firm—Robert R. Finch; Robert E. Krebs; Thomas S. MacDonald

[57] ABSTRACT

A vacuum receiver comprising a closed top vertical cylindrical tank with a central vacuum takeoff at the top, a tangential downwardly inclined feed conduit in the sidewall, an inverted conical bottom section with anti-swirl baffles therein, and a barometric leg extending downwardly from the apex of the bottom to termination in submergence in a lower seal tank. A conduit is provided to recycle a portion of discharge liquor from the seal tank to the top of the barometric leg. The slope of the conical bottom does not exceed about 40° from the vertical wall and inclination of the inlet conduit is about 15° from horizontal. The barometric leg length and diameter as well as the liquor recycle rate are selected to optimize final liquor discharge rate at prevailing vacuum and foam conditions.

1 Claim, 3 Drawing Figures

FOAM AND LIQUOR SEPARATOR

FIELD AND BACKGROUND OF THE INVENTION

This invention relates generally to vacuum filtration and in particular to a vacuum receiver of novel design for separating from air entrained foamy filtrate—such as generated in pulp washing operations—thus to enable the use of a vacuum pump with its more positively controlled vacuum rather than only barometric legs on vacuum filter pulp washers.

Some materials, such as paper pulps, contain soap or other foam producing substances. Foaming is enhanced by vacuum. In vacuum filter operations in which a vacuum pump is employed, foam is readily entrained in the air and unless separated therefrom, will be drawn into and damage the vacuum pump. Because of the difficulty of separating foam from air, vacuum pumps have not heretofore been widely utilized in vacuum filter pulp washing operations. Instead, barometric legs or standpipes have been used. Such devices, although in widespread use, are still not entirely satisfactory because they must be very long to generate needed vacuum hence require much headroom. In addition, they are often inconsistent.

In accordance with this invention, a specific receiver construction is provided which, in combination with a barometric leg, effects separation of foamy filtrate from air thus enabling use of a vacuum pump and reducing headroom requirements.

SUMMARY OF THE INVENTION

It is the primary object of this invention to provide ways and means for separating air from foamy filtrates discharged from vacuum filters, such as pulp washers, to the end that the vacuum pumps may be utilized as the primary source of vacuum for the filter.

A further object is the provision, in a system of the type described, of means for controlling the rate of discharge of foamy filtrate from the receiver while the latter is maintained at system vacuum.

A related object is the provision of ways and means enabling the use of a relatively short barometric leg or standpipe for discharging filtrate from the receiver without loss of vacuum, thus reducing headroom requirements.

In accordance with the invention, the foregoing and possibly other objects are attained by a closed cylindrical vessel, which may be called a receiver, located between the filter and vacuum pump. A centrally located top outlet provides a connection to the vacuum pump. Filtrate and air from the filter valve enters the receiver through a tangential inlet in its sidewall, the inlet being angled slightly below the horizontal to impart a downward component to the filtrate as it swirls around the wall. The vessel terminates in a lower inverted conical section from the apex of which a barometric leg depends to terminate in submergence in a lower seal tank from which filtrate is finally discharged.

At least one inwardly directed anti-swirl baffle is located on the inner wall of the conical bottom section.

The density of liquor in and thus the flow rate through the barometric leg is controlled by the introduction thereinto of regulated amounts of relatively dense deaerated or non-foamy filtrate, preferably taken from the seal tank.

In order that the invention be more readily understood and carried into effect, reference is made to the accompanying drawings and description thereof which are offered by way of explanation and not in limitation of the invention, the scope of which is defined by the appended claims and equivalents thereof.

Figure 3:
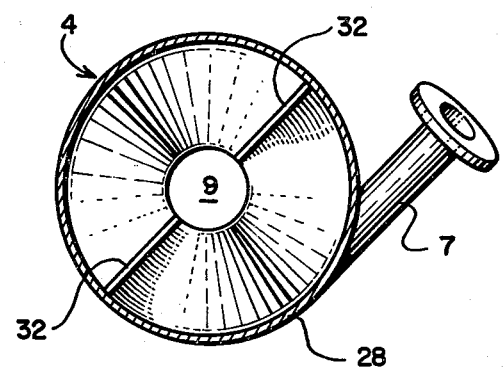
FIG. 3 is a sectional view of the receiver taken in the plane of line 3—3 of FIG. 2 looking in the direction of the arrows 3.

As shown in FIG.'S 2 and 3, the receiver 4 comprises a main cylindrical section 28; a top 29 with a central outlet 8, and a conical bottom section 31, the apex outlet 9 of which connects to the barometric leg 11. To subject the air-filtrate mixture to centrifugal separation, the inlet pipe 7 opens into the cylindrical section 28 tangentially at an elevation intermediate the top and bottom thereof; and to initiate immediate downward flow of the foamy filtrate, the inlet pipe 7 is positioned so that its axis points down at an angle of about 15° below horizontal. In operation, the liquid and foam are forced against the outer wall by centrifugal force and flow down toward and into the conical section to impinge on inwardly extending baffles 32 located on the inner wall therein. The baffles block vortex formation and stop spiral flow thus to direct flow through the outlet into the barometric leg 11 whence it flows into the tank 13.

The entire system is under vacuum originating in pump 6, hence the liquid cannot flow from the receiver until the weight of liquid in the barometric leg is sufficient to overcome the system vacuum. To insure constant discharge from the receiver while the latter is under system vacuum, the density of liquid in the barometric leg standpipe is controllably increased by the recycle of foam-free filtrate from the tank 13 into the upper part of the barometric leg adjacent the receiver bottom outlet 9. The higher density in the standpipe permits use of a shorter conduit thus reducing headroom.

Proper sizing of system components is essential. The diameter of the cylindrical section should be selected so that, at maximum air flow, the superficial air velocity therethrough does not exceed about three feet per second. Above that, foam and liquid will be entrained and carried to the pump.

DETAILED DESCRIPTION OF THE INVENTION

Figure 1:
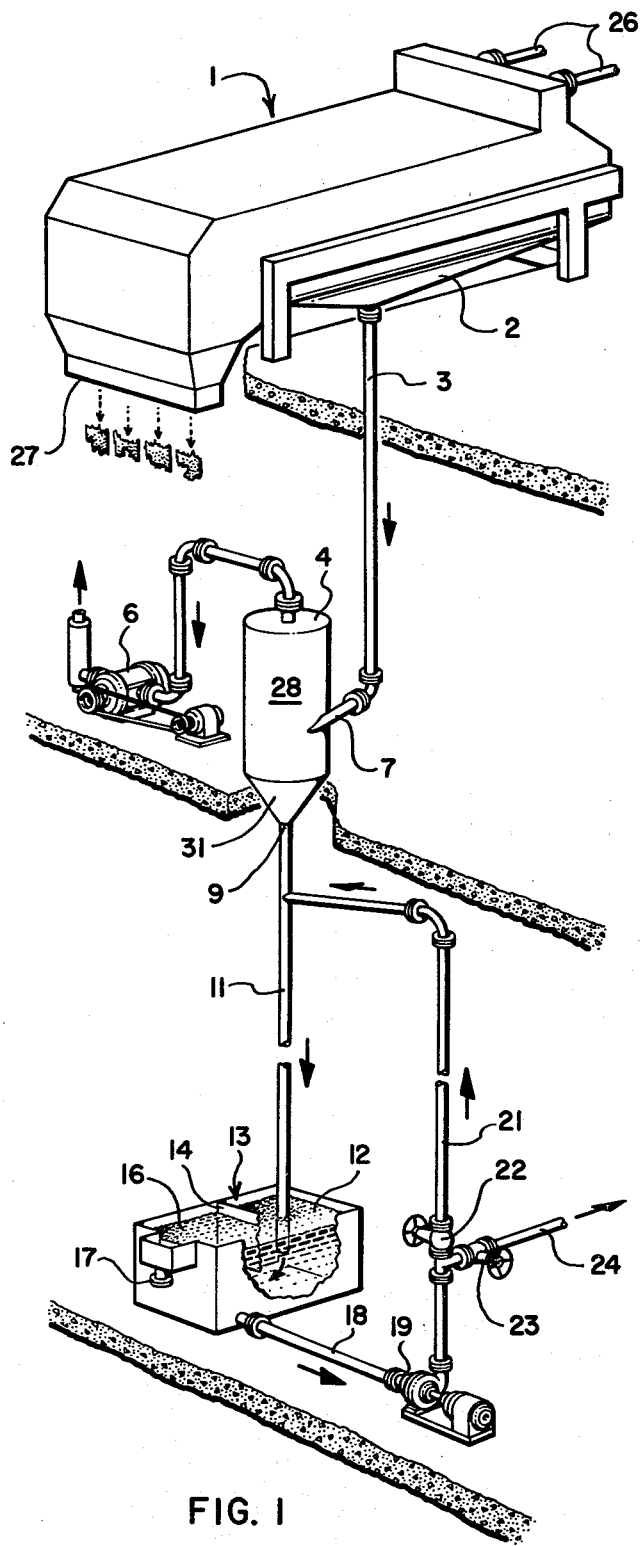
FIG. 1 is a simplified view of a vacuum filtration system embodying the vacuum receiver/foam separator of the invention.
Figure 2:
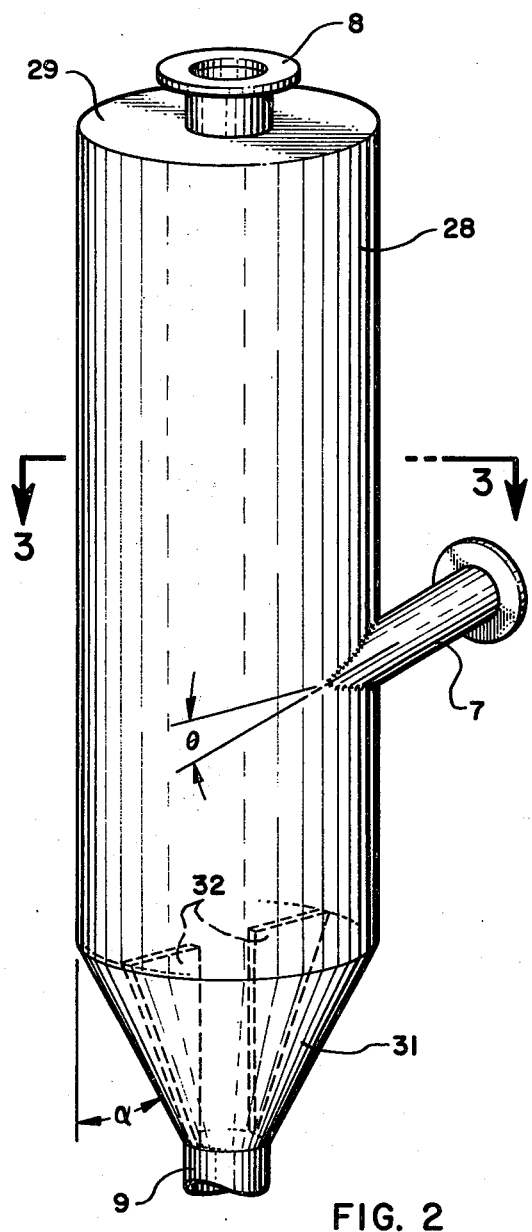
FIG. 2 is a side elevation of a receiver constructed in accordance with the invention, internal baffles being shown by dotted lines.

As illustrated in FIG. 1, the receiver or separator of the invention is embodied in a vacuum filter system which includes a filter 1 from which foamy filtrate is drawn through a vacuum pan 2, conduit 3 and a receiver 4, under influence of vacuum originating in a vacuum pump 6 connected to the receiver top. Entrained foamy filtrate enters the receiver 4 through an inlet conduit 7 entering tangentially through the vessel sidewall intermediate the top outlet 8 (which connects to the vacuum pump 6) and the bottom filtrate discharge outlet 9 that is connected to a barometric leg 11 which is simply a vertical standpipe. The barometric leg terminates in submergence in the receiving chamber 12 of a seal tank 13 where the foam is finally dissipated or broken. The filtrate then flows under a baffle 14 to a discharge chamber 16. Residual floating foam is discharged through an upper overflow outlet 17 while defoamed filtrate is withdrawn via a conduit 18 leading from submergence adjacent the bottom of the tank thence through a pump 19 from which a controlled volume of filtrate liquor is recycled, via conduit 21 and valve 22, to the top of the barometric leg 11 adjacent the bottom outlet 8 of the receiver. The balance of the filtrate is routed to further process via a second valve 23 and conduit 24.

Operation of the filter is conventional, feed slurry being introduced through one of the pipes 26 onto an endless moving filter belt (not shown) through which liquid is drawn by vacuum while solids are retained on top. The resulting layer of solids may be washed by liquid introduced through another of the pipes 26 and this wash liquor is also collected in the pan 2. Cake is discharged through the chute 27.

To insure that a downward flow is initiated upon entrance, the inlet should be directed at an angle of about 12°–16° below horizontal.

We have found that the bottom cone should be relatively steep, not more than about 40° measured from the vertical sidewall, of the receiver to avoid turbulence in transition of spiral flow along the vessel wall to the barometric leg standpipe.

The length and diameter of the barometric leg is critical as is the amount of recycle. Foam greatly reduces the specific gravity of filtrate flowing through the barometric leg and unless the density is increased by recycle as provided in this invention, an undesirably long leg would be needed. For instance, in a case where the specific gravity of the foamy filtrate is 0.23, a leg is needed of a length in feet equal to about four times the system vacuum measured in inches of mercury. That is, with a system vacuum of 5" Hg and a filtrate specific gravity of 0.23, a barometric leg about 20 feet long is needed. In contrast, if the standpipe is full of 1.0 specific gravity liquid, only a 5.8' barometric leg is needed at a system vacuum of 5" Hg.

The diameter of the barometric leg is also important as it should be selected to minimize pressure losses. A suitable diameter is one that, based on design flow of the system, will give a 1–3 f.p.s. flow of dense liquid through the leg. The sizing should take into account the total system flow, including recycle.

We claim:

1. A system for removing entrained liquor from the air stream withdrawn from a vacuum filter, comprising a receiver that includes a cylindrical vessel having a top and an inverted cone-shaped bottom portion, a centrally located top outlet adapted to be connected to a source of reduced pressure and a bottom outlet at the apex of said cone, both of said outlets being directed axially of said receiver, an inlet conduit entering the sidewall of said receiver intermediate the top and bottom, said conduit being connected tangentially through said sidewall and directed downwardly toward said bottom whereby to impart a downward swirling path to liquid introduced into said receiver, at least one inwardly extending baffle on the inner wall of said conical section above said bottom outlet, a vertical standpipe connected to said bottom outlet to extend downwardly therefrom, a seal tank below said receiver adapted to receive a mixture of foam and liquor from said vertical standpipe and effect separation of foam from liquid and to retain a minimal volume of separated liquid therein, the lower end of said vertical standpipe terminating in submergence in said liquid in said seal tank, a second conduit connecting the interior of said tank and said vertical standpipe at a location below said bottom outlet, and pump means for recycling a controlled volume of liquid from said tank into said vertical standpipe at a rate such that the density and weight of liquid in said vertical standpipe is sufficient to seal said bottom outlet of said cone thereby to enable application of vacuum to the interior of said receiver.

* * * * *